United States Patent
Komori

(10) Patent No.: US 6,839,255 B2
(45) Date of Patent: Jan. 4, 2005

(54) HIGH VOLTAGE POWER SOURCE APPARATUS

(75) Inventor: Chihiro Komori, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/413,586

(22) Filed: Apr. 15, 2003

(65) Prior Publication Data

US 2004/0004849 A1 Jan. 8, 2004

(30) Foreign Application Priority Data

Jul. 2, 2002 (JP) .................................. 2002-193574

(51) Int. Cl.[7] .............................................. H02M 3/24
(52) U.S. Cl. ........................................ 363/95; 363/131
(58) Field of Search ............................ 363/95, 131, 97, 363/56.08

(56) References Cited

U.S. PATENT DOCUMENTS 4,097,777 A * 6/1978 Bacharowski ................ 315/60

5,828,217 A * 10/1998 Inagaki et al. ............. 324/393

* cited by examiner

Primary Examiner—Shawn Riley
(74) Attorney, Agent, or Firm—Staas & Halsey LLP

(57) ABSTRACT

A high-voltage power source apparatus with a simple construction which outputs a voltage by overlapping a DC voltage with an AC voltage. An alternating current (AC) voltage generator generates an AC voltage and outputs the AC voltage to a secondary coil of a transformer. The AC voltage and the DC voltage are developed and simultaneously overlapped from a common secondary coil of the transformer. Thus, separate AC and DC voltage generators are not necessary to produce the overlapped voltage, simplifying construction. The DC portion of the overlapped voltage may be regulated by feeding back a sample of the output voltage to a control circuit which compares the feedback with a reference and regulates the DC portion accordingly. A plurality of the overlapped voltage circuits may be operated in parallel from a single secondary coil of the transformer.

23 Claims, 6 Drawing Sheets

HIGH VOLTAGE POWER SOURCE APPARATUS

BACKGROUND OF THE INVENTION

This application claims the priority of Japanese Patent Application No. 2002-193574 filed Jul. 2, 2002, in the Japan Intellectual Property Office, the disclosure of which is incorporated herein by reference.

1. Field of the Invention

The present invention relates to a high-voltage power source apparatus that is installed in a developing unit of a printer using electrophotography in order to obtain an output voltage that is an overlap of a direct current (DC) voltage with an alternating current (AC) voltage.

2. Description of the Related Art

In general, a printer, which prints an image using electrophotography, illuminates a laser beam on a photosensitive drum to form an electrostatic latent image thereon, applies toner onto the electrostatic latent image to develop the image, and transfers the image coated with the toner onto transfer paper. A developing unit of such a printer includes a case in which toner is stored, and a developing roller in the case. To develop an electrostatic latent image, the developing unit makes the developing roller contact a photosensitive drum via a 0.2 mm aperture thereof, and then rotates the developing roller and the photosensitive drum in order to adhere the toner covering the developing roller to the electrostatic latent image on the photosensitive drum via the aperture.

For instance, a circumference of the photosensitive drum is charged with an electric potential of −50V and the other circumference of the photosensitive drum is charged with an electric potential of −700 V. Next, a voltage is generated by overlapping a DC voltage of −300 V with an AC voltage of 2000 Volts peak to peak (Vp–p) and the overlapped voltage is applied to the developing roller. As a result, the toner cleaves only to the surface of the photosensitive drum which is charged with the electric potential of −50 V. Accordingly, a general printer requires a high-voltage power source apparatus as shown in FIG. 1 which makes a voltage by overlapping the DC voltage with the AC voltage and supplies the obtained voltage to the developing roller.

FIG. 1 is a circuit diagram of a conventional high-voltage power source apparatus that includes an AC voltage generator 100 and a DC voltage generator 200.

The AC voltage generator 100 comprises an operational amplifier OP1, a push pull output circuit having transistors Tr1 and Tr2 which are reciprocally connected to each other via bias resistors R1 and R2 and current limiting resistors R3 and R4, resistors R5 and R6 which form a voltage divider to bias a negative input of the operational amplifier OP1, a feedback resistor R7 connected between an output of the push pull output circuit and the negative input of the operational amplifier OP1, an input bias resistor R8, decoupling capacitors C1 and C2, a DC blocking capacitor C3 and a transformer T1.

The operational amplifier OP1 compares a pulse signal ACPWM (or a sine wave voltage) input to an input terminal 1 with a voltage which is obtained by adding a feedback voltage output from the push pull output circuit to a voltage determined by the resistors R5 and R6. Next, the operational amplifier OP1 outputs the result of the comparison to the push pull output circuit. The output of the operational amplifier OP1 is amplified by the push pull output circuit and output as an AC voltage to the DC blocking capacitor C3. The output AC voltage is stepped up by the transformer T1 and output as an AC voltage of 2000 Vp–p, which is similar to an input waveform, at a secondary side of the transformer T1. The capacitors C1 and C2 remove noise from input power sources, indicated as +24V and +5V, respectively.

The DC voltage generator 200 comprises a DC-to-DC converter which includes a controller 201 and a blocking oscillator 202. When a control signal CP is input to an input terminal 2 of the controller 201, a transistor Tr32 is switched on or off to cause the blocking oscillator 202 to oscillate or stop oscillating. An operational amplifier OP2 compares a reference voltage DCVref input through an input terminal 3 with a feedback voltage DCVfb input through an input terminal 4, and outputs the result of the comparison to a transistor Tr34. Then, the transistor Tr34 is controlled based on the comparison result to cause the blocking oscillator 202 to oscillate a frequency having a circuit constant value. A resistor R36 and a capacitor C34 filter the reference voltage DCVref which is input to the negative input of the operational amplifier OP2. A capacitor C35 decouples the positive input of the operational amplifier and diodes D32 and D33 limit the amplitude of the voltage DCVfb by clamping the voltage DCVfb to a power supply voltage +5V and to ground. A capacitor C36 and a resistor R37 provide feedback between an output and the input of the operational amplifier OP2. A resistor R38 couples the output of the operational amplifier OP2 to a base of the transistor Tr34. A collector of the transistor Tr34 is interfaced with the blocking oscillator 202 via a resistor R35 and a transistor Tr33 so that a collector voltage of the transistor Tr33 adjusts an internal reference voltage of the blocking oscillator 33 relative to a value established across a zener diode ZD31. The zener diode ZD31 is biased by current flowing from a power supply +24V through a resistor R31. A transistor Tr31 has a base connected to a common connection of the resistor R31 and the zener diode ZD31. An emitter of the transistor Tr31 is serially connected to ground via a resistor R33. A collector of the transistor Tr31 is protected from extreme negative voltages by a diode D31 which clamps to ground. A capacitor C31 provides decoupling of the +24V power supply. The 24V power supply is connected to one end of a primary coil of a transformer T1 and another end of the primary coil of the transformer T2 is connected to the collector of the transistor Tr31. A capacitor C32 is connected in parallel with the primary coil of the transformer T2. An auxiliary coil of the transformer T2 has one end connected to ground and another end which feeds back an induced current to the base of the transistor Tr31 through a capacitor C33 and a resistor R32. Respective polarities of the primary coil and the auxiliary coil are arranged so that the feedback through the transistor Tr31 results in an oscillatory voltage at the primary coil of the transformer T2, which couples an oscillatory output voltage to a coil on a secondary side of the transformer T2.

The oscillatory output voltage is extracted from the secondary side of the transformer T2, rectified and smoothed by a diode D34 and a capacitor C40 to provide a DC voltage. The DC voltage is is applied to a capacitor C5 connected in parallel with the secondary side of the transformer T1 through a resistor R43. The voltage applied to the capacitor C5 becomes a DC voltage of −300V, is overlapped with an AC voltage output from the transformer T2, flows through a protective resistor R10, and is output as an output voltage Dev through an output terminal 5. The output voltage Dev is applied to the developing roller.

When an output of the high-voltage power source apparatus of FIG. 1 is blocked, the resistor R11 discharges an electric current from the capacitor C5. Also, the DC voltage across the capacitor C40 is sampled by a voltage divider formed of resistors R41 and R42 to provide the voltage DCVfb, which is rectified and smoothed, is fed back to the input terminal 4 of the controller 201 as mentioned above. In addition, the pulse signal ACPWM, the control signal CP, and the reference voltage DCVref are respectively input to the input terminals 1, 2, and 3 at predetermined intervals, using a controller (not shown) included in a printer body.

As described above, a conventional high-voltage power source apparatus adopted by a developing unit of a general printer requires two high-voltage power source circuits, i.e., the AC voltage generator 100 and the DC voltage generator 200, thereby complicating the structure of the apparatus. For instance, the DC voltage generator 200 is a DC-to-DC converter including the controller 201 and the blocking oscillator 202 and therefore requires a large number of circuit elements as shown in FIG. 1. In particular, a color printer needs four DC voltage generators 200 for toners of four colors, i.e., yellow Y, magenta M, cyan C, and black B, thereby complicating the construction thereof and increasing the size and manufacturing costs.

SUMMARY OF THE INVENTION

The present invention provides a high-voltage power source apparatus with a simple construction, which obtains an output voltage that is an overlap of a direct current (DC) voltage with an alternating current (AC) voltage. That is, a central point of the AC voltage is offset from a reference, such as for example, circuit ground by a value of the DC voltage.

According to an aspect of the present invention, a high-voltage power source apparatus comprises an AC voltage generator that generates an AC voltage and outputs the AC voltage to a secondary side of a transformer; a capacitor connected to a secondary coil of the transformer in series; resistors connected to the capacitors in parallel; and a current direction limiting unit that is connected to the secondary coil of the transformer and charges the capacitors with an electric current, which is generated in a particular direction using the AC voltage. The apparatus overlaps the DC voltage charged in the capacitor with the AC voltage in order to obtain an output voltage.

More specifically, the AC voltage generator generates an AC voltage and outputs the AC voltage to the secondary side of the transformer, and the current direction limiting unit charges the capacitor with an electric current using the AC voltage. As a result, the AC voltage overlaps a DC voltage charged in the capacitor to generate an output voltage. The magnitude of the DC voltage charged in the capacitor depends on a resistor, which is connected to the capacitor in parallel, and a resistor connected to the current direction limiting unit in series. Thus, the high-voltage power source apparatus according to the present invention does not require a DC voltage generator with a complicated structure, which is adopted by the related art, thereby simplifying the structure thereof.

BRIEF DESCRIPTION OF THE DRAWINGS

The above and/or other aspects and advantages of the present invention will become more apparent by describing in detail embodiments thereof with reference to the attached drawings in which.

DESCRIPTION OF THE PREFERRED EMBODIMENTS

Figure 1:
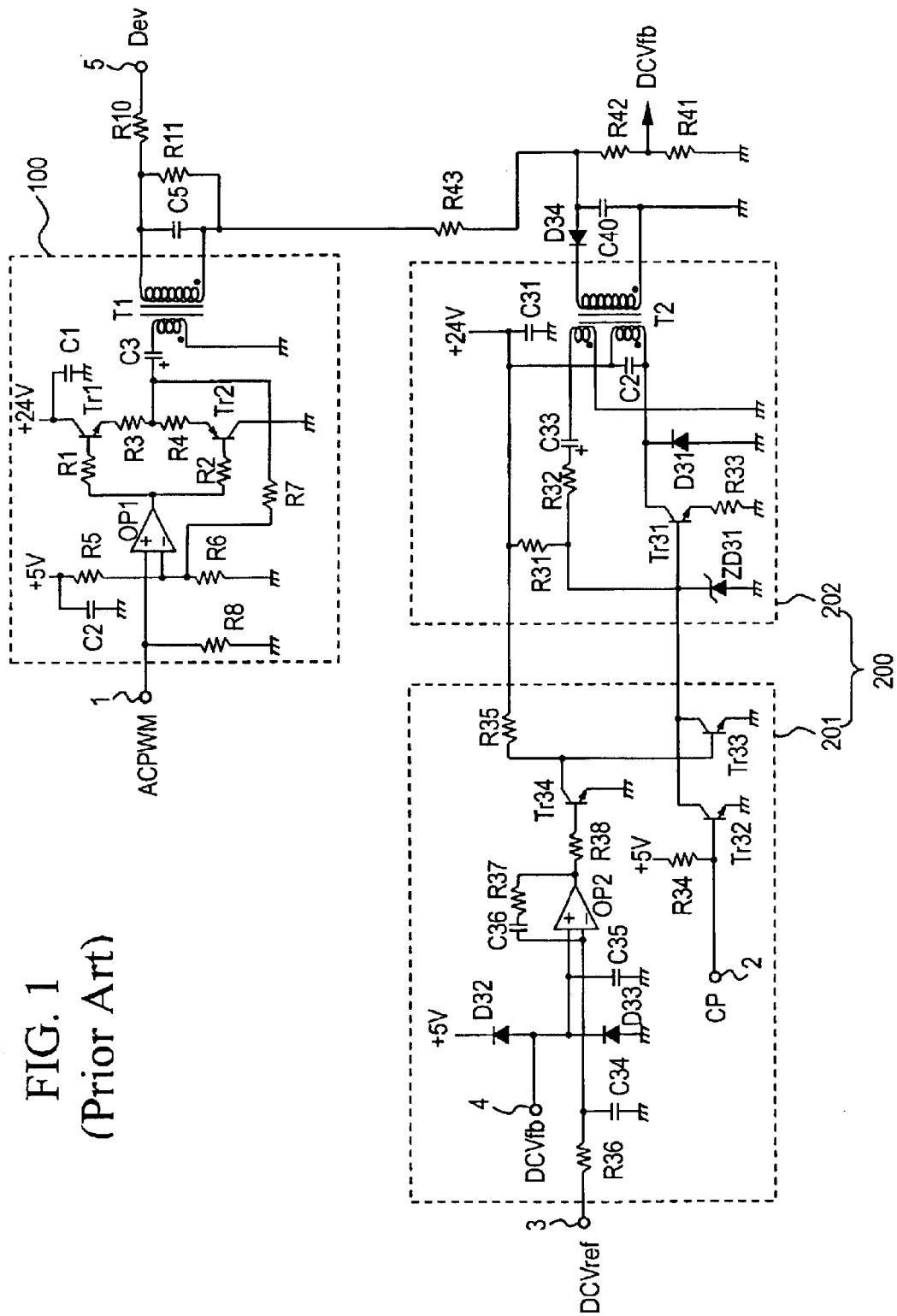
FIG. 1 is a circuit diagram of a conventional high-voltage power source apparatus.

Reference will now be made in detail to the present embodiments of the present invention, examples of which are illustrated in the accompanying drawings, wherein like reference numerals refer to like elements throughout. [Hereinafter, embodiments of a high-voltage power source apparatus according to the present invention will be described with reference to the accompanying drawings.]

Figure 2:
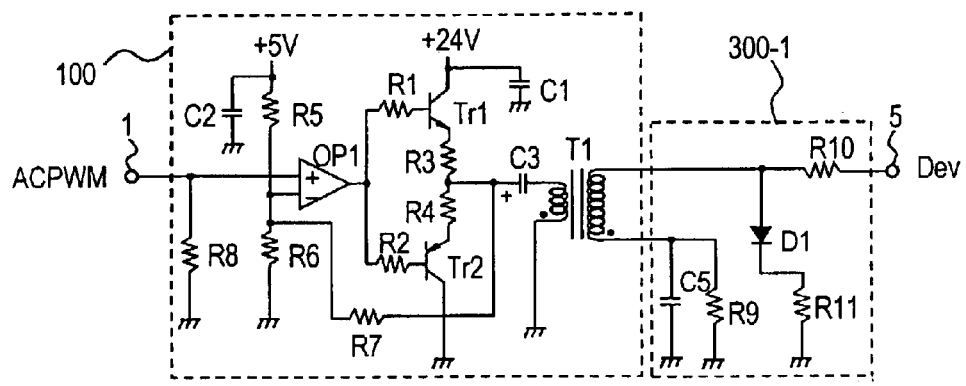
FIG. 2 is a circuit diagram of a high-voltage power source apparatus according to a first embodiment of the present invention.

FIG. 2 is a circuit diagram of a high-voltage power source apparatus according to a first embodiment of the present invention. Here, elements that are the same as elements shown in FIG. 1 are indicated with the same reference numerals as shown in FIG. 1 and descriptions of such elements will not be repeated.

Referring to FIG. 2, the first embodiment comprises an AC voltage generator 100, which may have a same construction as the conventional AC voltage generator 100 shown in FIG. 1, and an AC/DC overlapped voltage generator 300-1. As mentioned above, an AC voltage is output to a secondary side of a transformer T1. The first embodiment does not require the controller 201, the blocking oscillator 202, the diode D34, the capacitor C40, and the resistors R41, R42, and R43 as shown in FIG. 1.

Further, in the apparatus according to the first embodiment, a charging capacitor C5 and a discharging resistor R9 are connected to each other in parallel between one end of a secondary coil of the transformer T1 and ground. Also, a diode D9 and a current limiting resistor R11 are connected with each other in series between another end of the secondary coil of the transformer T1 and ground.

In the AC/DC overlapped voltage generator 300-1 shown in FIG. 2, a portion of an AC voltage, for example, 2000 Vp–p, which is output from the secondary side of the transformer T1, is rectified by the diode D9 and the capacitor C5 is charged via the resistor R11. When a DC voltage is output at a connection point between the capacitor C5 and the secondary coil of the transformer T1, the DC voltage is overlapped with the AC voltage and the overlapping result is output as an output voltage Dev to an output terminal 5 via the resistor R10. The output voltage Dev is supplied to a developing roller of a printer.

The magnitude of an electric current charged in the capacitor C5 depends on a ratio of the resistor R9 to the resistor R11. When the capacitor C5 is charged with a particular magnitude of an electric current, a particular magnitude, e.g., −300V, of DC voltage is generated. The resistor R9 immediately discharges the capacitor C5 when an output of the AC voltage generator 100 of FIG. 2 is blocked.

Accordingly, unlike the conventional high-voltage power source apparatus of FIG. 1, the apparatus according to the first embodiment does not include a separate DC voltage generator with a complicated construction, thereby simplifying a construction of an overlapped voltage generator compared with the generator shown in FIG. 1.

Figure 3:
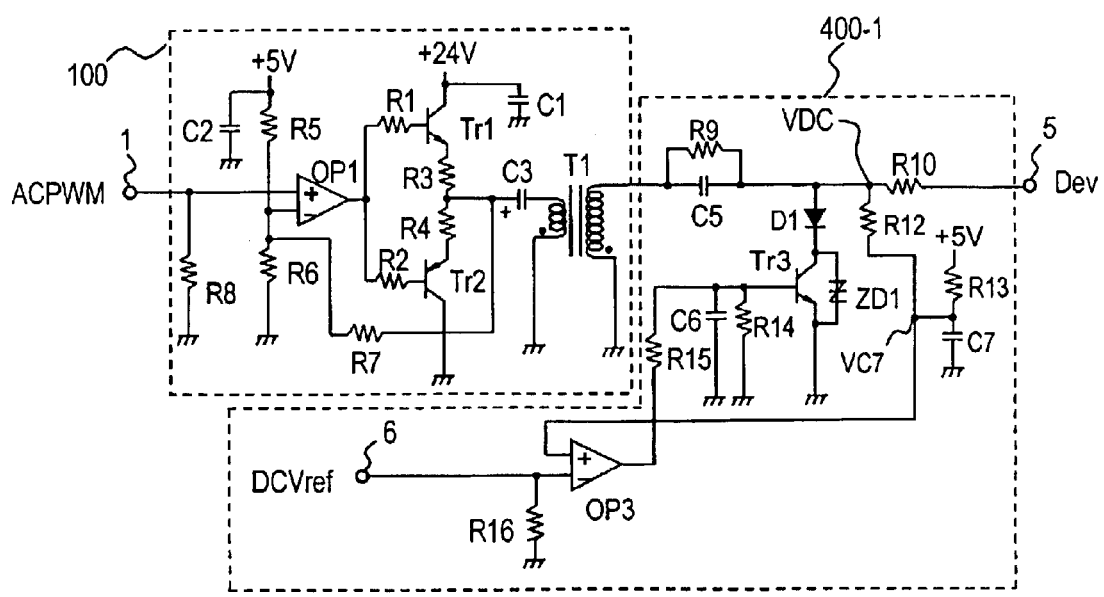
FIG. 3 is a circuit diagram of a high-voltage power source apparatus according to a second embodiment of the present invention.

FIG. 3 is a circuit diagram of a high-voltage power source apparatus according to a second embodiment of the present invention. Here, elements that are the same as those in FIG. 1 are indicated with the same reference numerals as shown in FIG. 1 and descriptions of such elements will not be repeated.

The second embodiment comprises an AC voltage generator 100 and an AC/DC overlapped voltage generator 400-1. As compared to the high-voltage power source apparatus of FIG. 1, the second embodiment uses a transistor Tr3 as a current limiter, instead of the resistor R11 of FIG. 2. Also, an output voltage VDC is divided by resistors R12 and R13 which are voltage dividing resistors. The divided voltage is integrated by an integration capacitor C7 so as to extract a DC component signal VC7. The DC component signal VC7 is used to observe the output voltage VDC. The DC component signal VC7 is fed back to the transistor Tr3 so as to control the transistor Tr3.

When a reference voltage DCVref is input to an input terminal 6 using a controller (not shown), an operational amplifier OP3 compares the reference voltage DCVref with the DC component signal VC7 and outputs the result of the comparison. In response to the result of comparison, the transistor Tr3 varies a resistance between a collector and an emitter of the transistor Tr3.

A capacitor C5 and a resistor R9 are installed at one end of a secondary coil of a transformer T1. The operations of the capacitor C5 and the resistor R9 of FIG. 3 are substantially the same as those of the capacitor C5 and the resistor R9 of FIG. 2. The apparatus of FIG. 3 further comprises a capacitor C6 for the removal of noise, and resistors R14 and R15 which are biasing resistors for the transistor Tr3. A varistor ZD1 conducts current to protect the transistor Tr3 if an overvoltage is applied across the transistor Tr3.

Figure 4:
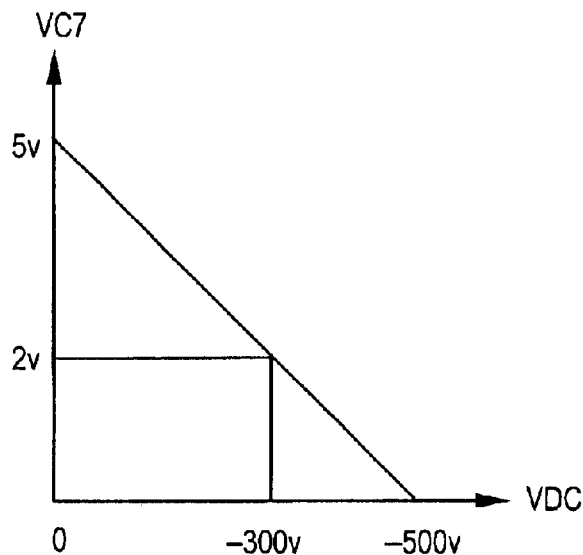
FIG. 4 is a graph illustrating a relationship between an output voltage and a DC component signal which is obtained by dividing and integrating the output voltage.

As an example of the operation of the apparatus according to the second embodiment, when the output voltage VDC of −300V is divided by the resistors R12 and R13 to become a voltage of −3V, a voltage of +5V is applied to the resistor R12 so as to obtain a DC component signal VC7 of +2V. Also, as shown in FIG. 4, if the output voltage VDC changes between 0V and −500V, the voltage for the component signal VC7 changes between 0 and +5V.

The operational amplifier OP3 compares the feedback DC component signal VC7 and the reference voltage DCVref of +2V and controls the collector-emitter resistance of the transistor Tr3 based on a result of the comparison. For instance, if the output voltage VDC is lower than −300V, the operational amplifier OP3 increases the resistance between the collector and the emitter of the transistor Tr3 to lower the level of a voltage charged in the capacitor C7. Conversely, if the output voltage VDC is higher than −300V, the operational amplifier OP2 reduces the resistance between the collector and the emitter of the transistor Tr3 to raise the level of the voltage charged in the capacitor C7. In this way, the DC component signal VC7 is controlled to be the same as the reference voltage DCVref.

Therefore, the apparatus according to the second embodiment stably controls an electric current charged in the capacitor C5 so as to obtain a stable output voltage VDC. Also, an intensity of a DC voltage, which is applied to a developing roller, may be changed to a desired level.

Here, the transistor Tr3 is an NPN type transistor such as for example, a transistor which is used in a circuit called a dynamic focus in a television receiver. That is, an inexpensive general high voltage transistor may be used as the transistor Tr3, thereby reducing costs of manufacturing the high-voltage power source apparatus according to the second embodiment.

Figure 5:
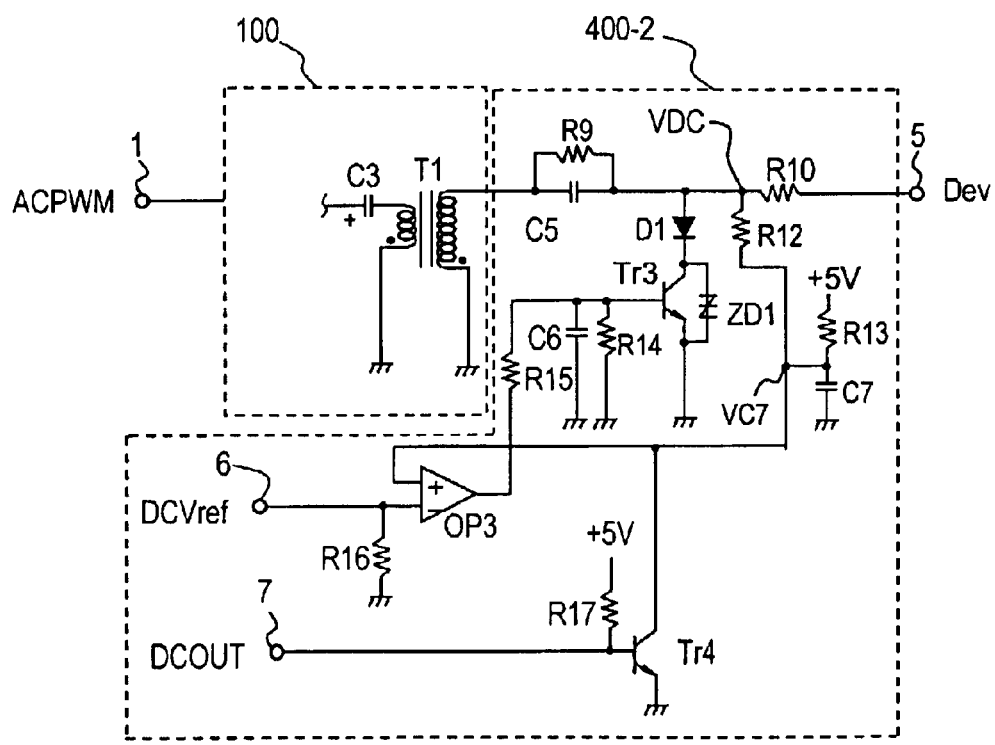
FIG. 5 is a circuit diagram of major parts of a high-voltage power source apparatus according to a third embodiment of the present invention.

FIG. 5 is a circuit diagram of major parts of a high-voltage power source apparatus according to a third embodiment of the present invention. The third embodiment comprises an AC voltage generator 10 and an AC/DC overlapped voltage generator 400-2. Elements that are the same as those in FIGS. 1 and 3 are indicated with the same reference numerals and descriptions of such elements will not be repeated. The AC voltage generator 100 of FIG. 5 may be the same as the AC voltage generator 100 of FIGS. 1, 2 and 3.

In the case of the conventional high-voltage power source apparatus shown in FIG. 1, the AC voltage generator 100 and the DC voltage generator 200 are independently constructed, and thus, the DC voltage is controllable using the controller 201 of the DC voltage generator 200. In contrast, a high-voltage power source apparatus as shown in FIGS. 3 and 5, in which an AC voltage generator and a DC voltage generator are combined, requires an integration circuit, such as for example, the capacitor C7, to obtain the feedback DC component signal VC7 for the control of the transistor Tr3. For this reason, when the pulse signal ACPWM is input to the input terminal 1 of the AC voltage generator 100 or the reference voltage DCVref is input to the input terminal 6, the output of the output voltage Dev is delayed in the integration circuit and thus overshoot occurs in the output voltage VDC.

To solve this problem, the apparatus according to the third embodiment further comprises a transistor Tr4, which prevents the occurrence of overshoot of an output voltage, in a circuit that feeds back a DC component signal VC7 generated by a capacitor C7. If a control voltage DCOUT is applied to an input terminal 7, the transistor Tr4 is switched on or off to suppress the occurrence of overshoot in the output voltage. In other words, the transistor Tr4 is a device that controls the DC component signal VC7 by preventing the output voltage from rising to a higher level. When a voltage of +5V is applied to a base of the transistor Tr4 via a resistor R17, the transistor Tr4 is switched on.

In order to obtain an output voltage Dev, the control voltage DCOUT is applied to the transistor Tr4 to switch off the transistor Tr4, and then, the DC component signal VC7 is controlled to make the output voltage VDC reach 0V, thereby suppressing the occurrence of overshoot. That is, when the output voltage VDC is 0V, the transistor Tr4 is switched on and the DC component signal VC7 has a potential of 0V. Under such a condition, when the pulse signal ACPWM is input to the input terminal 1 of the AC voltage generator 100 and the reference voltage DCVref is applied to the input terminal 6, the control voltage DCOUT is applied to the input terminal 7 to switch off the transistor Tr4. In this way, the DC component signal VC7 gradually rises to a certain level from the potential of 0V, and thus, overshoot is minimized in the output voltage Dev.

Figure 6:
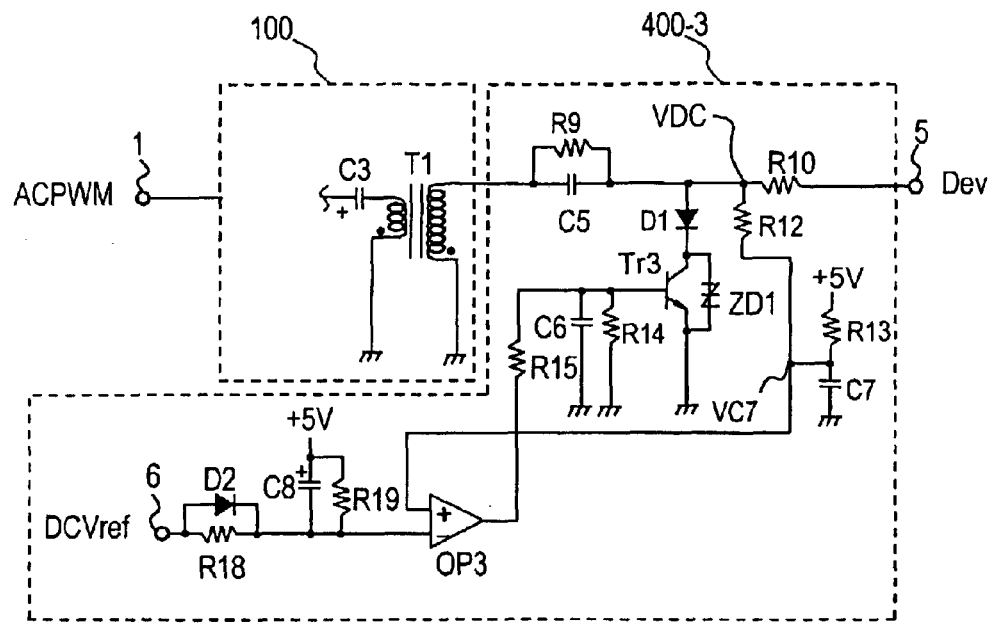
FIG. 6 is a circuit diagram of major parts of a high-voltage power source apparatus according to a fourth embodiment of the present invention.

FIG. 6 is a circuit diagram of the major parts of a high-voltage power source apparatus according to a fourth embodiment of the present invention. The fourth embodiment comprises an AC voltage generator 100 and an AC/DC overlapped voltage generator 400-3. Elements shown in FIG. 6 that are the same as those in FIGS. 3 and 5 are indicated with the same reference numerals and descriptions of such elements will not be repeated.

The AC/DC overlapped voltage generator 400-3 shown in FIG. 6 comprises a time-constant circuit that uses time-constant resistors R18 and R19, a time-constant capacitor C8, and a diode D2, instead of the transistor Tr4 of FIG. 5, to suppress the occurrence of overshoot. Referring to FIG. 6, a reference voltage DCVref, which is applied to an input terminal 6, is delayed by a predetermined time constant and then applied to an operational amplifier OP3. As a result, the rising of an output voltage VDC to a certain level is deferred to suppress the occurrence of overshoot in an output voltage VDC.

Figure 7:
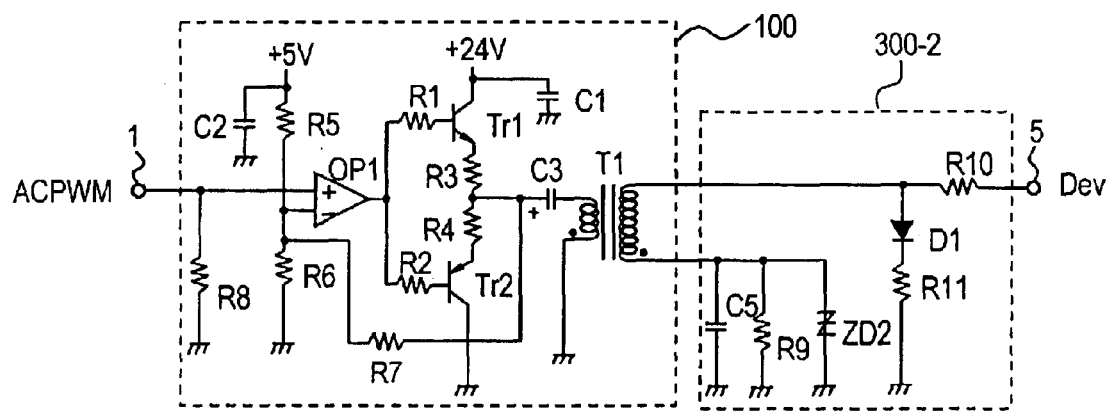
FIG. 7 is a circuit diagram of major parts of a high-voltage power source apparatus according to a fifth embodiment of the present invention.

FIG. 7 is a circuit diagram of the major parts of a high-voltage power source apparatus (hereinafter, the "apparatus") according to a fifth embodiment of the present invention. The fifth embodiment comprises an AC voltage generator 100 and an AC/DC overlapped voltage generator 300-2. Elements corresponding to those of FIG. 2 are indicated with the same reference numerals and descriptions of such elements will not be repeated.

Relative to the apparatus shown in FIG. 2, the apparatus of FIG. 7 further comprises a varistor ZD2 connected in parallel with the capacitor C5 and which clamps a voltage across the capacitor C5 at a predetermined value.

Referring to FIG. 7, when a voltage charged in the capacitor C5 exceeds a predetermined varistor voltage, the varistor ZD2 conducts and a current charged in the capacitor C5 is limited by the varistor ZD2. Thus, a voltage across the capacitor C5 increases until the capacitor voltage reaches the the varistor voltage and then the capacitor voltage stabilizes. With the use of the varistor ZD2, the capacitor C5 stably outputs an output voltage Dev.

Figure 8:
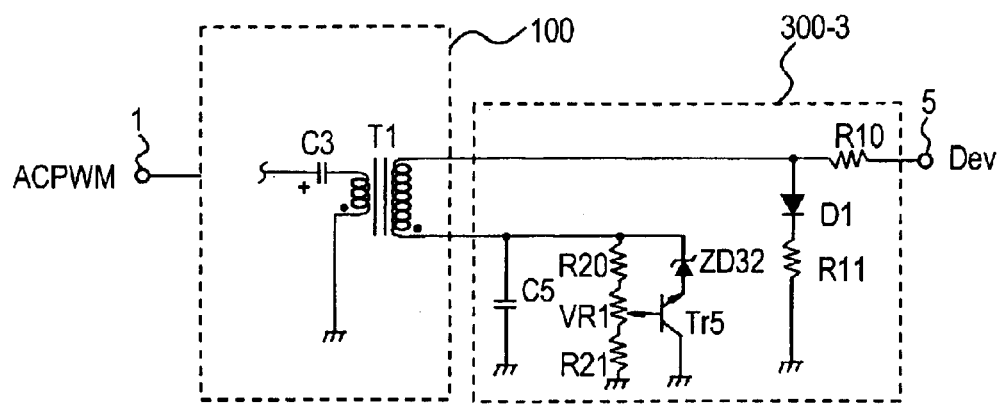
FIG. 8 is a circuit diagram of major parts of a high-voltage power source apparatus according to a sixth embodiment of the present invention.

FIG. 8 is a circuit diagram of the major parts of a high-voltage power source apparatus according to a sixth embodiment of the present invention. The sixth embodiment comprises an AC voltage generator 100 and an AC/DC overlapped voltage generator 300-3. Elements corresponding to those of FIG. 2 are described with the same reference numerals and descriptions of such elements will not be repeated.

Referring to FIG. 8, an active clamp circuit replaces the resistor R9 of FIG. 2. The active clap circuit comprises a first circuit, in which voltage dividing resistors R20, VR1 and R21 are connected with one another in series, which is installed in parallel with the capacitor C5. A second circuit, in which a zener diode ZD32 and a clamping transistor Tr5 are connected in series, is installed in parallel with the first circuit. A collector of the transistor Tr5 is grounded. A voltage which is divided by the dividing resistors R20, VR1 and R21 is applied to a base of the transistor Tr5.

More specifically, a voltage charged in the capacitor C5 is divided by the resistors R20, VR1 and R21 and the divided voltage is applied to the base of the transistor Tr5. A voltage division ratio δ may be expressed as (R20+αVR1)/(R20+VR1+R21), where α has a value of 0 to 1. If the divided voltage is larger than a sum of a base emitter voltage of the transistor Tr5 and a zener breakdown voltage of the zener diode ZD32, the transistor Tr5 and the zener diode ZD32 conduct and a current charged in the capacitor C5 is limited. As a result, a value of the voltage output from the capacitor C5, i.e., an output voltage Dev, is almost the same as a value calculated by (the base emitter voltage of Tr5+the zener voltage of ZD32)×(1/δ). Thus, the capacitor C5 stably outputs the output voltage Dev. Also, the output voltage Dev is adjustable by controlling the variable resistor VR1.

Figure 9:
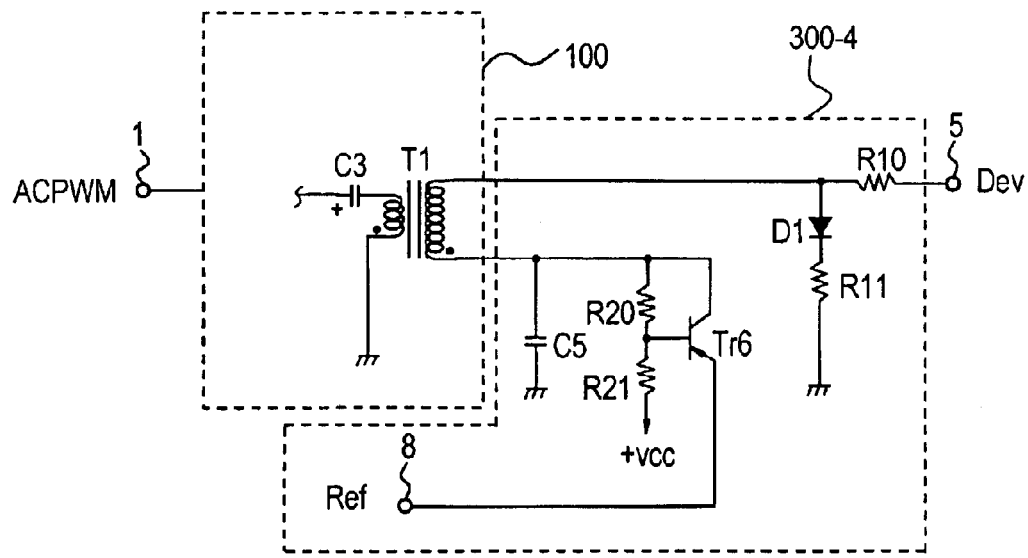
FIG. 9 is a circuit diagram of major parts of a high-voltage power source apparatus according to a seventh embodiment of the present invention.

FIG. 9 is a circuit diagram of the major parts of a high-voltage power source apparatus according to a seventh embodiment of the present invention. The seventh embodiment comprises an AC voltage generator 100 and an AC/DC overlapped voltage generator 300-4. Elements corresponding to elements shown in FIGS. 2 and 8 are indicated with the same reference numerals and descriptions of such elements are not be repeated.

Relative to the apparatus shown in FIG. 2, in the apparatus according to the seventh embodiment, the resistor R9 is removed and resistors R20 and R21 are connected with each other in series between one end of the capacitor C5 and a power source voltage +VCC. A clamping transistor Tr6 is connected to the resistors R20 and R21 and the capacitor C5. A control voltage Ref is input to an input terminal 8 and then applied to an emitter of the transistor Tr6. The clamping transistor Tr6 and the resistors R20 and R21 form a voltage clamping unit.

Referring to FIG. 9, a voltage charged in the capacitor C5 is divided by the resistors R20 and R21 and applied to a base of the transistor Tr6. If the voltage is greater than a sum of a base-emitter voltage of the transistor Tr6 and the control voltage Ref, the transistor Tr6 conducts and a current charged in the capacitor C5 is limited. Thus, an output voltage Dev output from the condenser C5 is almost the same as a value calculated by (the base emitter voltage of Tr6+the reference voltage Ref)×(R20+R21)/R21]. Thus, the voltage Dev is stably output.

In the seventh embodiment, the transistor Tr6 is a PNP type transistor. When the collector of the transistor Tr6 is supplied with a negative voltage, the power source voltage +VCC is connected to the resistor R21 so as to apply the control voltage Ref of a positive value to the transistor Tr6.

Alternatively, the circuit of FIG. 9 may be constructed such that a signal similar to the signal VC7 as illustrated in FIG. 5 may be fed back from the base of the transistor TR6.

Figure 10:
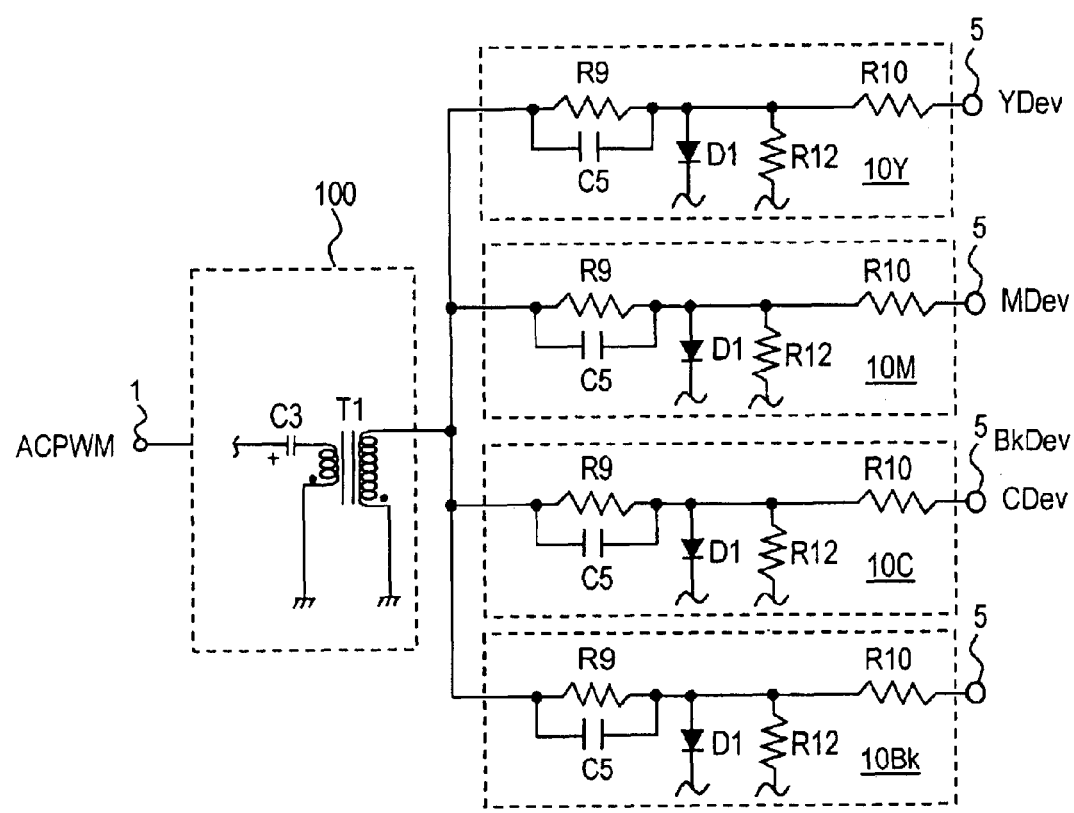
FIG. 10 is a circuit diagram of major parts of a high-voltage power source apparatus according to an eighth embodiment of the present invention.

FIG. 10 is a circuit diagram of the major parts of a high-voltage power source apparatus according to an eighth embodiment of the present invention. Here, elements that are the same as in FIGS. 3, 5 and 6 are described with the same reference numerals and descriptions of such elements will not be repeated.

The apparatus according to the eighth embodiment is adapted for use in a color printer. In detail, the apparatus includes four high-voltage power source circuits 10Y, 10M, 10C, and 10Bk, as shown in FIG. 10, which correspond to the colors yellow Y, magenta M, cyan C, and black Bk, respectively. Each of the circuits 10Y, 10M, 10C, and 10Bk may have a same construction as AC/DC overlapped voltage generators 400-1, 400-2 or 400-3 shown in FIGS. 3, 5 and 6, respectively, in which an AC voltage generator is combined with a DC voltage generator. Referring to FIG. 10, four capacitors C5 and four resistors R9 are connected with a second side of a transformer T1. Each capacitor C5 is connected in parallel with a respective resistor R9 and each parallel combination is connected in series with a respective resistor R10. A diode D1 and a resistor R12 in each circuit 10Y, 10M, 10C and 10Bk interface with a remaining part of a respective one of the AC/DC overlapped voltage generators 400-1, 400-2, or 400-3 as shown in FIGS. 3, 5, and 6, respectively. Thus, DC voltages are overlapped with AC voltages to become output voltages YDev, MDev, CDev, and BkDev and these output voltages are output to output terminals 5 of the circuits 10Y, 10M, 10C, and 10Bk, respectively.

As described above, a high-voltage power source apparatus according to the present invention generates a high-voltage output by overlapping a DC voltage with a high-voltage, without a DC voltage generator with a complicated construction. Therefore, the construction of the high-voltage power source apparatus according to the present invention is simplified, thereby reducing the manufacturing costs therefor.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A high-voltage power source apparatus comprising:
an alternating current (AC) voltage generator which generates an AC voltage and outputs the AC voltage at a secondary coil of a transformer;
a capacitor serially connected with the secondary coil of the transformer;
a resistance connected in parallel with the capacitor;
a current and direction limiting unit which is serially connected with the secondary coil and which charges the capacitor with a DC voltage using the output AC voltage as a power source;
a voltage dividing unit which divides the output voltage;
an integration unit which integrates the divided voltage to output a DC component signal; and
a controller which controls the current direction limiting unit based on the DC component signal output from the integration unit, wherein:
the AC voltage overlaps the DC voltage charged in the capacitor to obtain an output voltage.

2. The apparatus of claim 1, wherein the current direction limiting unit comprises:
a diode serially connected with the secondary coil and a potential reference point.

3. The apparatus of claim 2, wherein the current direction limiting unit further comprises:
a second resistance serially connected between a cathode of the diode and the potential reference point.

4. The apparatus of claim 1, wherein the current direction limiting unit comprises:
a transistor having a collector and an emitter are serially connected with the secondary coil and a potential reference point and a base connected to an output of the controller.

5. The apparatus of claim 1, wherein the controller compares the DC component signal with a reference voltage and controls the current direction limiting unit based on the comparison.

6. The apparatus of claim 4, wherein the controller compares the DC component signal with a reference voltage and controls the current direction limiting unit based on the comparison.

7. The apparatus of claim 1, further comprising:
a DC voltage controlling unit which controls the DC component signal in response to a control voltage, to prevent an increase in a level of the output voltage.

8. The apparatus of claim 4, further comprising:
a DC voltage controlling unit which controls the DC component signal in response to a control voltage, to prevent an increase in a level of the output voltage.

9. The apparatus of claim 5, further comprising:
a DC voltage controlling unit which controls the DC component signal in response to a control voltage, to prevent an increase in a level of the output voltage.

10. The apparatus of claim 6, further comprising:
a DC voltage controlling unit which controls the DC component signal in response to a control voltage, to prevent an increase in a level of the output voltage.

11. The apparatus of claim 1, wherein:
the controller compares the DC component signal with a reference voltage and controls the current direction limiting unit based on the comparison;
the current direction limiting unit comprises:
a transistor having a collector and an emitter serially connected with the secondary coil and a potential reference point and a base connected to an output of the controller; and
the apparatus further comprises:
a time constant unit which delays inputting the reference voltage to the controller by a predetermined time constant to prevent an increase in a level of the output voltage.

12. The apparatus of claim 4, wherein:
the controller compares the DC component signal with a reference voltage and controls the current direction limiting unit based on the comparison; and
the apparatus further comprises:
a time constant unit which delays inputting the reference voltage by a predetermined time constant to prevent an increase in a level of the output voltage.

13. The apparatus of claim 5, further comprising:
a time constant unit which which delays inputting the reference voltage by a predetermined time constant to prevent an increase in a level of the output voltage.

14. A high-voltage power source apparatus comprising:
an alternating current (AC) voltage generator which generates an AC voltage and outputs the AC voltage at a secondary coil of a transformer;
a capacitor serially connected with the secondary coil of the transformer;
a resistance connected in parallel with the capacitor;
a current and direction limiting unit which is serially connected with the secondary coil and which charges the capacitor with a DC voltage using the output AC voltage as a power source; and
a voltage clamping unit which clamps the voltage charged in the capacitor to a predetermined value, using a varistor connected to the capacitor in parallel,
wherein the AC voltage overlaps the DC voltage charged in the capacitor to obtain an output voltage.

15. The apparatus of claim 14, wherein the current and direction limiting unit comprises:
a diode serially connected with the secondary coil and a potential reference point.

16. The apparatus of claim 2, further comprising:
a voltage clamping unit which clamps the voltage charged in the capacitor to a predetermined value, using a varistor connected to the capacitor in parallel.

17. The apparatus of claim 15, wherein the current direction limiting unit further comprises:

a second resistance serially connected between a cathode of the diode and the potential reference point.

18. The apparatus of claim 3, further comprising:

a voltage clamping unit which clamps the voltage charged in the capacitor to a predetermined value, using a varistor connected to the capacitor in parallel.

19. A high-voltage power source apparatus comprising:

an alternating current (AC) voltage generator which generates an AC voltage and outputs the AC voltage at a secondary coil of a transformer;

a capacitor serially connected with the secondary coil of the transformer;

a resistance connected in parallel with the capacitor;

a current and direction limiting unit which is serially connected with the secondary coil and which charges the capacitor with a DC voltage using the output AC voltage as a power source; and a voltage clamping unit which clamps the voltage charged in the capacitor, when the voltage charged in the capacitor reaches a predetermined level, wherein the AC voltage overlaps the DC voltage charged in the capacitor to obtain an output voltage.

20. The apparatus of claim 19, wherein the current direction limiting unit comprises:

a diode serially connected with the secondary coil and a potential reference point.

21. The apparatus of claim 2, further comprising:

a voltage clamping unit which clamps the voltage charged in the capacitor, when the voltage charged in the capacitor reaches a predetermined level.

22. The apparatus of claim 20, wherein the current direction limiting unit further comprises:

a second resistance serially connected between a cathode of the diode and the potential reference point.

23. The apparatus of claim 3, further comprising:

a voltage clamping unit which clamps the voltage charged in the capacitor, when the voltage charged in the capacitor reaches a predetermined level.

* * * * *

UNITED STATES PATENT AND TRADEMARK OFFICE
CERTIFICATE OF CORRECTION

PATENT NO. : 6,839,255 B2
DATED : January 4, 2005
INVENTOR(S) : Komori

It is certified that error appears in the above-identified patent and that said Letters Patent is hereby corrected as shown below:

Column 9,
Line 31, replace ":" with -- ; --

Column 10,
Line 40, remove "which"

Signed and Sealed this

Fifth Day of July, 2005

JON W. DUDAS
*Director of the United States Patent and Trademark Office*